Nov. 17, 1936.  P. J. KIRCHER  2,061,278
SCALE
Filed Sept. 29, 1934  2 Sheets-Sheet 1
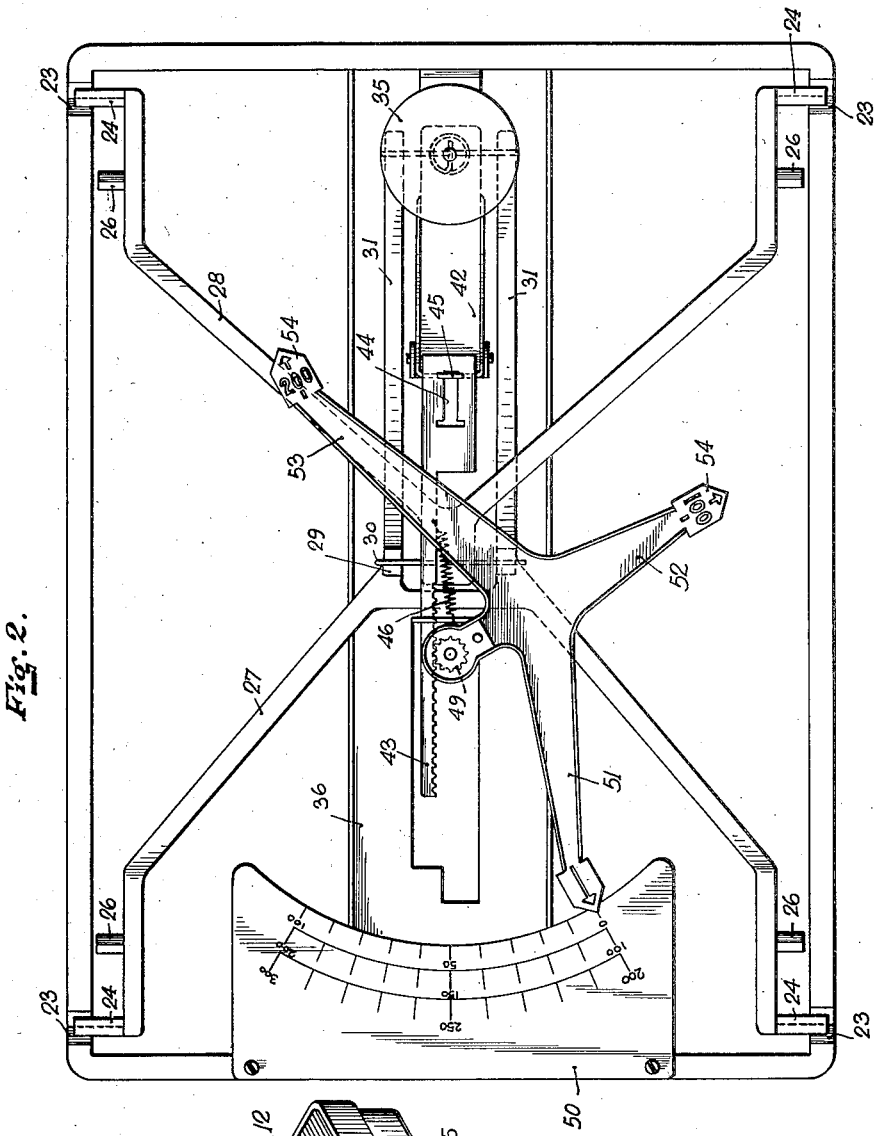
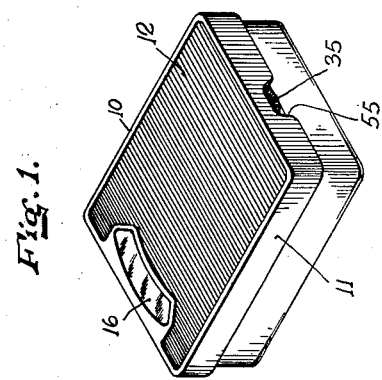
INVENTOR
BY PAUL J. KIRCHER,
Duell & Kane.
ATTORNEYS.

Nov. 17, 1936.  P. J. KIRCHER  2,061,278
SCALE
Filed Sept. 29, 1934  2 Sheets-Sheet 2
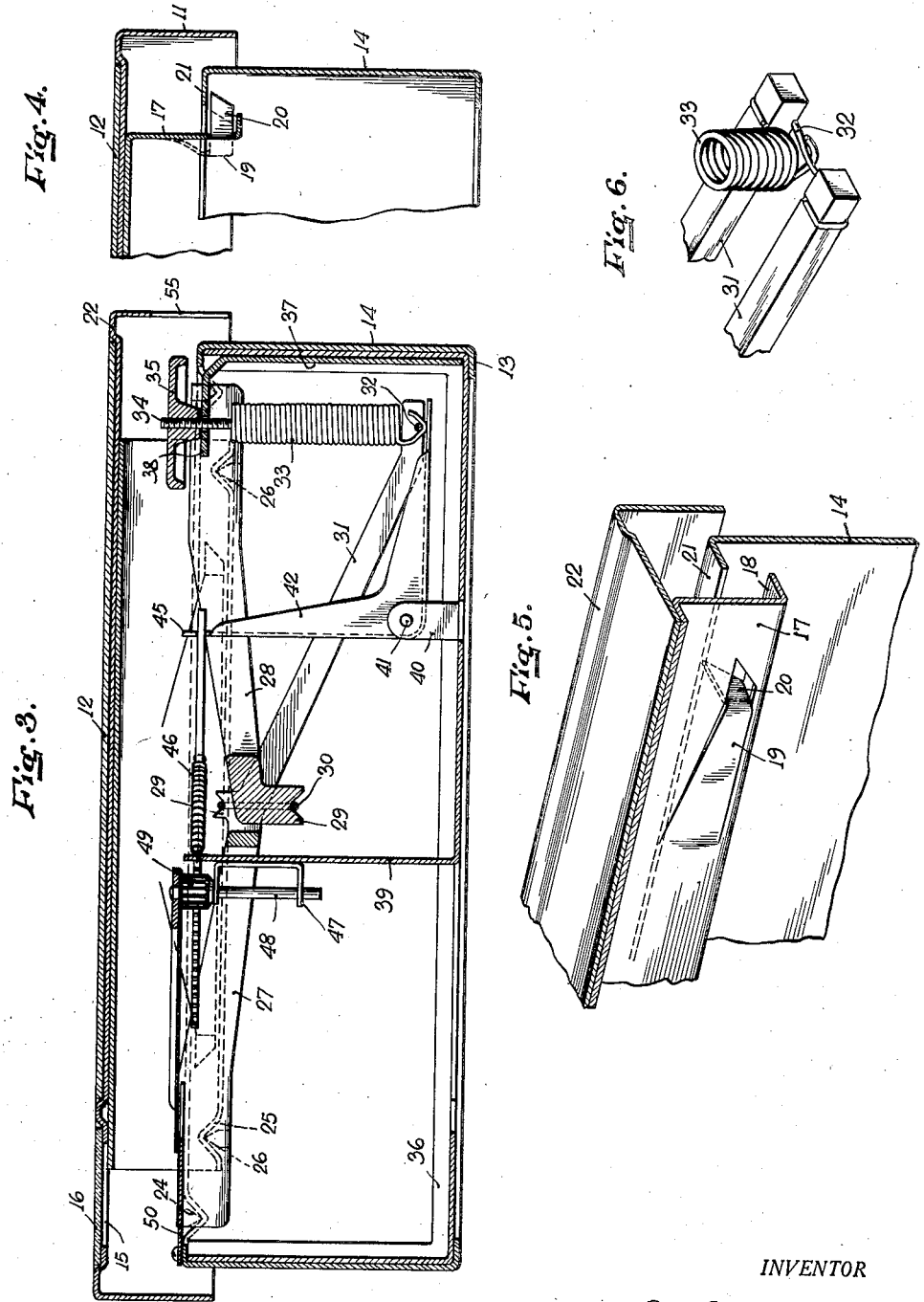
INVENTOR
PAUL J. KIRCHER,
BY Duell & Kane.
ATTORNEYS.

Patented Nov. 17, 1936

2,061,278

UNITED STATES PATENT OFFICE 2,061,278

SCALE

Paul J. Kircher, Brooklyn, N. Y., assignor to The Jacobs Bros. Co. Inc., Brooklyn, N. Y., a corporation of New York Application September 29, 1934, Serial No. 746,038

6 Claims. (Cl. 265—68)

This invention relates to a structurally and functionally improved weighing scale.

It is an object of this invention to construct an apparatus of this nature, the various features of which (both collectively and individually) may be utilized in connection with various types of scales, but which structure is primarily intended for use in scales of the bathroom type.

A further object of the invention is that of furnishing a scale which will present an extremely compact, unitary structure of minimum height, but which at the same time will adequately and efficiently support a person to be weighed, and accurately register such person's weight.

A further object of the invention is that of providing an apparatus of this nature embodying relatively few parts, each individually simple and rugged in construction and largely capable of manufacture by quantity production methods; such parts being capable of assemblage by relatively unskilled labor. However, the parts are so proportioned and arranged that the scale may be "trued up" by a skilled operator with minimum effort, so as to be ready for sale. Accordingly, there is produced an apparatus which may be manufactured at minimum expense and sold at a relatively nominal figure, such apparatus operating over long periods of time with freedom from difficulty.

With these and other objects in mind, reference is had to the attached sheets of drawings illustrating one practical embodiment of the invention, and in which—

Fig. 1 is a perspective view of a complete scale;

Fig. 2 is a plan view showing the scale with the platform removed therefrom;

Fig. 3 is a longitudinal sectional view of the assembled scale;

Fig. 4 is a fragmentary transverse sectional view illustrating the relationship of the platform and casing or base;

Fig. 5 is a perspective view of these parts; and

Fig. 6 is also a perspective view, and showing the method which is preferably employed in coupling the scale spring to the lever mechanism.

Referring primarily to Fig. 1, it will be seen that the numeral 10 indicates the platform of the scale, which has a downwardly extending flange portion 11, and may be covered with suitable material as at 12. This platform is supported upon a base, including in the present exemplification a bottom portion 13 and side walls 14.

At this time it will be noted that both of these members are preferably formed of sheet metal, and that the scale platform is formed with an opening or cut-out portion 15 providing a sight opening or window which may be covered by a transparent element 16, the latter being preferably disposed in the plane of the covering 12.

Secured to the under face of the platform are a pair of longitudinally extending strips 17, which may be bent to have flange portions 18, so as to incorporate therein a maximum factor of rigidity. This attachment may be effected in any desired manner, as for example by welding the strips to the under face of the platform, and it will thus be obvious that the entire body of the latter is reinforced to an extent such that no fear of buckling or distortion need be felt. With a view to securing the platform against accidental displacement with respect to the base, the strips may have integral tongue portions 19 stamped from their bodies, these portions having their free ends angularly offset as at 20 to underlie the inwardly extending flange portions 21 of the base. As in Fig. 4, these end portions may have their free edges extending at a tangent, so that, as has been indicated in dotted lines, the platform may be pressed downwardly, resulting in the tongues being flexed inwardly until the upper edges thereof clear the flange 21, whereupon these elements will snap to the position indicated in full lines, thus preventing accidental detachment of the parts. As has also been clearly shown in Figs. 3, 4 and 5, the platform proper may be shaped to provide ridge portions 22 extending both longitudinally and transversely of its body, these ridge portions serving to incorporate additional rigidity and, moreover, defining zones of proper area to receive the covering 12, panel 16, etc. Moreover, as has been indicated in these figures, the strips 17 need not necessarily be separate elements, but could actually form the side flanges of a main plate structure, the body of which is fixed to the under side of the platform.

The flange portions 21 are periodically depressed to provide notches 23, which serve as bearings for the support of pivot members 24. Moreover, the lower edges or flanges 18 of the strips 17, or their equivalents, are periodically formed with similar indented portions 25 which provide bearing portions for the reception of pivot or knife edge members 26 similar to the elements 24. These portions of the flanges 21 and 18 may be especially hardened, or if the bodies or faces of the strips are formed of suitable material, this will be unnecessary, it being obvious that suitable bearing members or portions are provided.

The knife edge members or pivots 24 and 26 form parts of beams 27 and 28. Both of these beams include divergent arms of which the pivot elements preferably form an integral part, and the crotches of these arm portions substantially align with each other, as has been indicated at Fig. 3. At this point of alignment, additional bearings 29 are provided, forming a part of the respective levers or beams, and connection between these elements is furnished, as for example by providing a wire loop 30 at this point, which rides within the crotch of each bearing element and serves as a coupling agent common to both of the same. Before passing from consideration of this factor, it will, of course, be understood that, as has been shown in Fig. 2, the bearing portions 29 associated with one beam (as shown, the beam 27) are two in number, while merely a single beam portion may form a part of the second beam, and thus provide a balanced construction.

While the beam 28 terminates adjacent this bearing portion, the beam 27 is continued beyond the same in the form of a pair of arms 31. Adjacent its outer end—which is preferably inclined downwardly—these arms are formed with aligned grooves into which may be clipped the ends of a generally U-shaped wire element 32. The central portion or base of this element may be bent upwardly, as in Fig. 6, to provide what might be termed a notched structure serving to maintain in centralized condition the body of a coil spring 33, the end of which is simply hooked around the element 32. The upper end of the spring is secured in any desired manner to a mounting element which extends in the form of or is connected to a screw-threaded stem 34. The threads of the latter are engaged by an adjusting nut 35, it being obvious that if the latter is properly supported, by turning the same with reference to the stem 34, the spring will be tensioned to a greater or lesser extent.

Now with a view to furnishing a support for this nut as well as the mechanism to be hereinafter described, it will be observed that there is positioned in the base and extending longitudinally thereof a mounting member in the form of a channeled strip 36. This member snugly underlies the flange 21, so that there will be no danger of movement of the parts occurring. If desired, spot welding might be resorted to, to assure against such movement. Affixed to the face of this channeled strip and adjacent the rear thereof is a supporting strip 37, which has a horizontal portion 38 formed with an opening to accommodate the stem 34. In this manner the nut is adequately supported, and the tensioning of the spring may be effected. It will, of course, be understood that the strip 36 also serves to rigidify the base, and this strip has portions 39 and 40 struck from it, the latter portions serving, together with a pin 41, as a mounting for a bell-crank lever 42. This lever may also be stamped out, and has its outer arm underlying the arms 31 but is not connected thereto except by having the lower end of the spring 33 or any equivalent portion bearing against it. The portion 39 of the strip is bent upwardly as shown in Fig. 3 and is slotted at its adjacent end to furnish a mounting for a rack-bar 43. This rack-bar has its rear end terminating in an enlarged portion within which a T-shaped slot 44 may be conveniently formed. This slot permits of the passage of a correspondingly shaped upper arm portion 45 of the bell-crank lever 42, it being obvious that after the latter is threaded through such slot and the parts are drawn to the position shown in Fig. 2, accidental detachment of such parts is precluded. To assure such normal position of the parts, a spring 46 may be employed, which has one of its ends connected to the portion 39, its opposite end being secured to the rack-bar. The portion 39 also mounts a bracket 47, which serves to rotatably support a shaft 48 having at its upper end a pinion 49 which meshes with the teeth of the rack-bar, and this shaft additionally mounts an indicating or registering element which will be more fully described in the succeeding paragraph.

As heretofore recited, the platform is formed with an opening 14 which may be covered as at 15. The base mounts a chart 50 at a point underlying this sight opening. This chart, as shown in Fig. 2, may include three series of indicia running from 0 to 100; 100 to 200; and 200 to 300 pounds respectively. This indicia is arranged in arcuate form at varying distances from the shaft 48. Cooperating therewith is a registering element which in the present exemplification includes a body having three arms 51, 52 and 53 respectively. As illustrated, each of these arms is of a different length so that the first of the same sweeps that portion of the indicia which shows graduations from 0 to 100. The second arm is angularly disposed with reference to the first arm to an extent sufficient that when the latter registers with the 100 mark, the second arm also registers with a 100 mark, but this latter mark is situated at the second series of indicia. The third arm 53 is of greater length (i. e., a greater distance from the shaft 48) than the preceding arms, and consequently traverses the third series of graduations, which indicate from 200 to 300 respectively. This arm is also angularly disposed with reference to the arm 52 to the same extent that the arm is angularly disposed with reference to the arm 51. In this manner it is obvious that the registering mechanism may be extremely compact, and each one of the arms—and especially the arms 52 and 53—may have thereon an indicating portion 54 which will clearly show what might be termed the tare weight. In other words, the operator, seeing the arm 52 in registration with one of the graduations of the second series, will know that one hundred and odd pounds is the weight value indicated. The traversing of the indicia by the arm 53 will similarly indicate that two hundred and odd pounds is the factor involved. In view of the obviously simple nature of an alternative form of registering mechanism, it has been thought that it would be mere surplusage to fully describe the same. Such form would, however, employ merely graduations, for example, running from 0 to 100, and which would be swept by arms functionally equivalent to the arms 51, 52 and 53. These arms would preferably be of equal length, and the arm 52 would have thereon a value indicating tab showing, for example, "100" while the arm 53, as illustrated, would have, for example, a tab showing "200". In this way the operator would know that the arm 52, when visible, was indicating weight values between 100 and 200 pounds, while for weight values between 200 and 300 pounds, the tab 54 of the arm 53 would be visible. Obviously, the arm 51 would weigh from 0 to 100 pounds.

In reviewing the structure involved, it will be appreciated that in manufacture the parts lend themselves ideally to quantity production. The platform may simply be stamped out after which the strips 17 or the body providing the same are affixed thereto. The platform has associated with it the covering 12, as well as the glass 16, and (after painting) is now ready for application to the base.

The strip 36 is positioned within the latter, as is also the mounting member 37. The spring 33 has the stem 34 inserted through the mounting member, and the knurled nut 35 secures the spring against dislodgment. The bell-crank lever 42 is mounted upon the stem 40 by means of the pin 41, and the beams 27 and 28 are mounted to have the pivot members 24 thereof ride within the notched portions of the flange 21. The rack-bar 43 is mounted upon the supporting portion 49, and has its end coupled to the end of the portion 45 of the bell-crank lever by inserting the latter in the opening provided and shifting the parts to the position shown in Fig. 2. The spring 29 may now be coupled, and the pinion and the shaft 48 is associated with the part 47. The platform is now forced downwardly, so that the angularly extending end portions 20 of the tongues 19 ride against the portions 21 and snap into position, it being obvious that the notched portions 25 of the strips will now rest upon the pivot or knife edge elements 26. Through the cut-out portion 55 in the rear flange of the platform the nut 35 may be turned so as to adjust the parts, i. e., bring the end of arm 51 into registration with the zero indication of the chart when no weight is on the platform.

The scale is now ready for use, and it is apparent that by this construction a form of apparatus is produced which will have minimum height and be extremely compact.

Thus, among others, the several objects of the invention as specifically afore noted, are achieved. It will be understood that numerous changes in construction and rearrangement of the parts might be resorted to without departing from the spirit of the invention as defined by the claims.

Having thus fully described the invention, what is claimed is:

1. As an article of manufacture, a scale platform, a strip extending from the under face thereof, a substantially horizontally extending flange formed along the entire outer edge of such strip, and said flange being indented at a number of points to provide notched portions for the accommodation of knife-edge pivot members.

2. As an article of manufacture, a scale platform, a strip extending therefrom and to provide a support in cooperation with other scale parts, and a tongue forming a part of such strip and extending angularly therefrom to lock such platform against accidental detachment from such parts and with which such platform may be subsequently associated.

3. As an article of manufacture, a scale platform, a strip extending therefrom and to provide a support in cooperation with other scale parts, and a spring tongue forming a part of such strip and including an angularly offset portion to engage with scale parts with which such platform may subsequently be associated to prevent an accidental detachment of such platform therefrom.

4. In combination, a scale base and a platform, a flange forming a part of one of said members, a tongue having an offset end portion forming a part of the other of said members, said tongue being flexible and disposed to have its end portion normally underlie such flange to prevent accidental detachment of the parts, the end of such tongue portion camming against such flange as said platform is applied to said base.

5. A scale including, in combination, a base, a platform movable with respect to the same, means for supporting such platform, a registering mechanism connected to said last named means to indicate the weight value of an article upon such platform, and such registering mechanism including a chart, a rotatable mounting member, a plurality of pointers of different lengths having their ends secured to said mounting member, and said chart having upon its face a plurality of series of indicia arranged arcuately at different distances from said mounting member.

6. A scale including, in combination, a base, a platform movable with respect to the same, means for supporting such platform, a registering mechanism connected to said last named means to indicate the weight value of an article upon such platform and such registering mechanism including a chart, a rotatable mounting member, a plurality of pointers of different lengths having their ends secured to said mounting member, said chart having upon its face a plurality of series of indicia arranged arcuately at different distances from said mounting member, said pointers sequentially traversing said indicia as said mounting member swings with respect to the latter, and means identifying the weight value indicated by such different pointers.

PAUL J. KIRCHER.